(12) United States Patent
Kitsui

(10) Patent No.: US 10,130,222 B2
(45) Date of Patent: Nov. 20, 2018

(54) BIOTECHNOLOGY TOILET PROVIDED WITH DECOMPOSING PROCESS DEVICE, AND READY-TO-ASSEMBLE LAVATORY PROVIDED WITH SAME

(71) Applicant: Seiwa Denko Co., Ltd., Asahikawa, Hokkaido (JP)

(72) Inventor: Toshihiro Kitsui, Hokkaido (JP)

(73) Assignee: Seiwa Denko Co., Ltd., Asahikawa, Hokkaido (JP)

( * ) Notice: Subject to any disclaimer, the term of this patent is extended or adjusted under 35 U.S.C. 154(b) by 0 days.

(21) Appl. No.: 15/871,082

(22) Filed: Jan. 15, 2018

(65) Prior Publication Data

US 2018/0255986 A1    Sep. 13, 2018

(30) Foreign Application Priority Data

Mar. 7, 2017    (JP) .................. 2017-043332

(51) Int. Cl.
| | |
|---|---|
| *A47K 11/02* | (2006.01) |
| *B09B 3/00* | (2006.01) |
| *B01F 7/08* | (2006.01) |
| *B01F 7/00* | (2006.01) |
| *B01F 15/00* | (2006.01) |

(52) U.S. Cl.
CPC .......... *A47K 11/02* (2013.01); *B01F 7/00208* (2013.01); *B01F 7/00391* (2013.01); *B01F 7/081* (2013.01); *B01F 7/086* (2013.01); *B01F 15/00201* (2013.01); *B09B 3/0008* (2013.01); *B01F 2015/00642* (2013.01); *B01F 2215/0042* (2013.01); *B01F 2215/0054* (2013.01); *Y02A 50/455* (2018.01)

(58) Field of Classification Search
CPC ...................................... A47K 11/02

USPC ............................... 4/319, DIG. 12
See application file for complete search history.

(56) References Cited

U.S. PATENT DOCUMENTS 4,499,614 A * 2/1985 Yeagley ................. A47K 11/02
                                                      4/111.1

FOREIGN PATENT DOCUMENTS

| JP | 2000-246211 A | 9/2000 |
| JP | 2004-231802 A | 8/2004 |

(Continued)

OTHER PUBLICATIONS

Japanese Office Action dated May 17, 2017.
Japanese decision to Grant a Patent dated Jul. 24, 2017.

*Primary Examiner* — Lauren Crane
(74) *Attorney, Agent, or Firm* — Yokoi & Co., U.S.A.; Toshiyuki Yokoi

(57) ABSTRACT

A biotechnology toilet provided with a decomposing process device and a non-flush toilet bowl attached to a toilet bowl attachment plate that covers the toilet bowl opening of the decomposing process device, in which: the conveying blades are disposed at both ends of the rotation shaft; a circumferential stirring member that stirs an organic waste and a sawdust in a circumferential direction is fastened to each of the rotation shaft between the conveying blade and the internal side face of the process tank; two drive mechanisms are provided on an outer side face of the process tank, the two rotation shafts are driven and rotated by the respective drive mechanisms connected one by one to the respective rotation shafts; the two drive mechanisms are controlled by a single control device of the decomposing process device via different control circuits.

2 Claims, 10 Drawing Sheets

(56) References Cited

FOREIGN PATENT DOCUMENTS

| | | | |
|---|---|---|---|
| JP | 2006-167498 | A | 6/2006 |
| JP | 3909336 | B | 4/2007 |
| JP | 2009-233609 | A | 10/2009 |
| JP | 2010-110345 | A | 5/2010 |
| JP | 2013-099394 | A | 5/2013 |

* cited by examiner

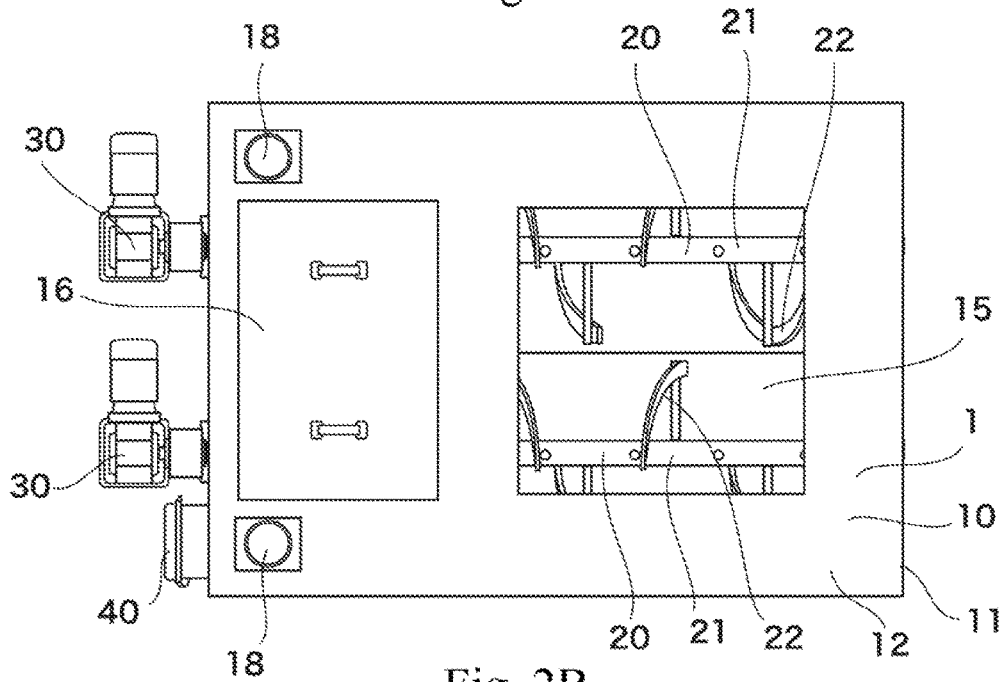
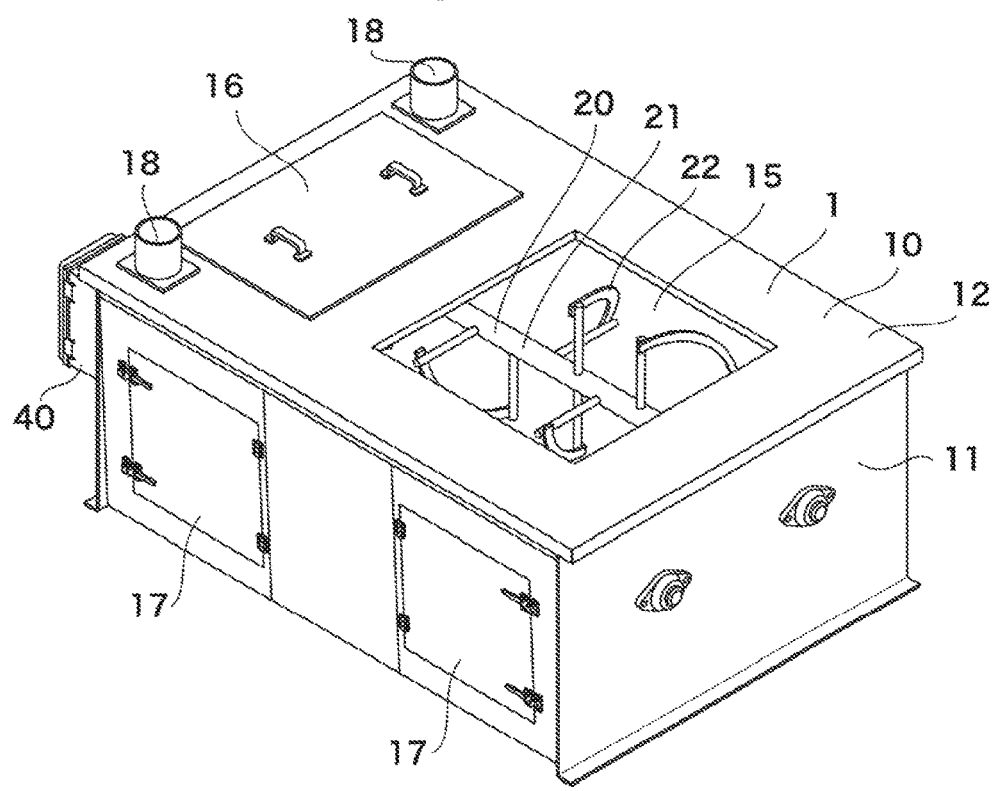

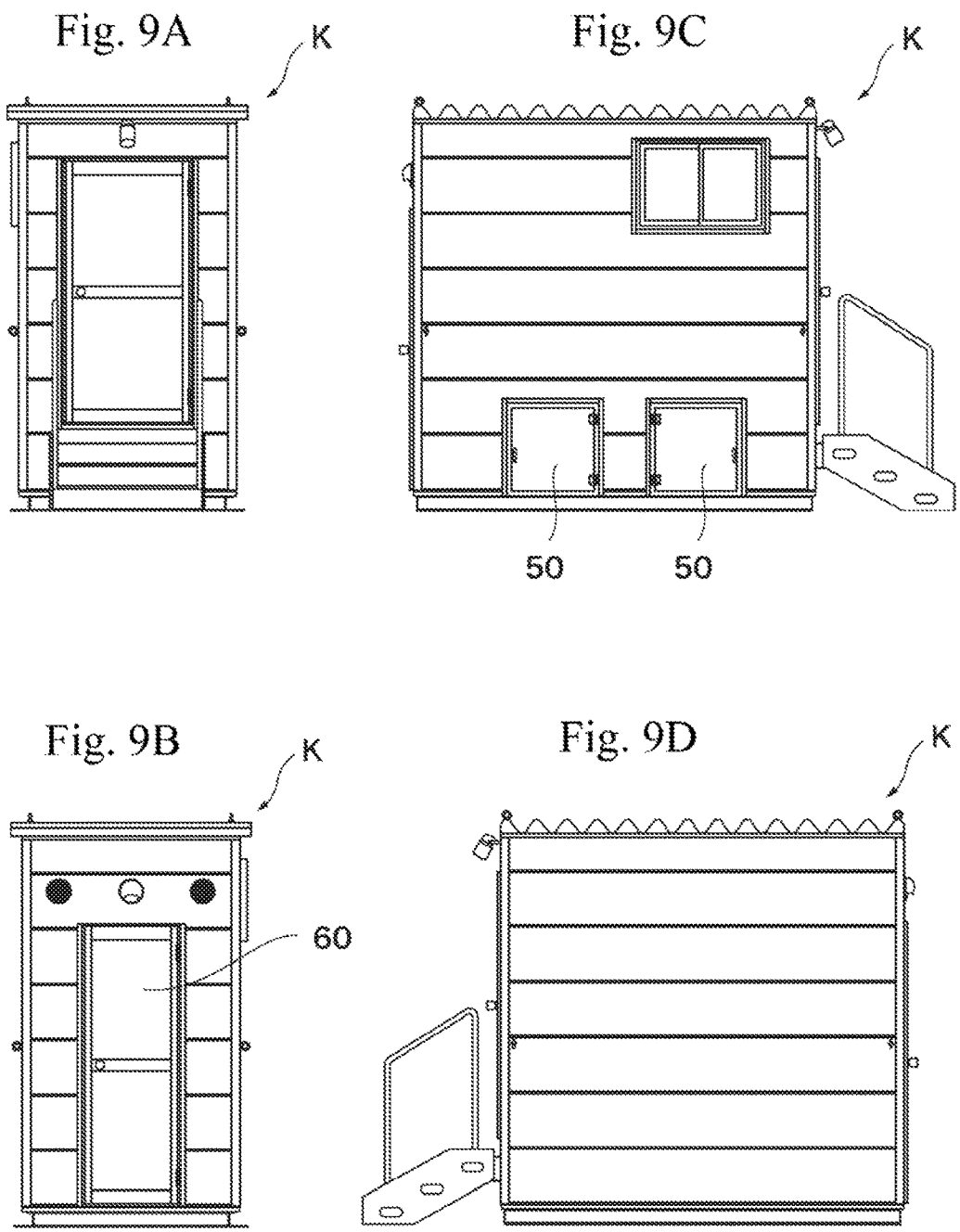

BIOTECHNOLOGY TOILET PROVIDED WITH DECOMPOSING PROCESS DEVICE, AND READY-TO-ASSEMBLE LAVATORY PROVIDED WITH SAME

CROSS-REFERENCES TO RELATED APPLICATIONS

This patent specification is based on Japanese patent application, No. 2017-43332 filed on Mar. 7, 2017 in the Japan Patent Office, the entire contents of which are incorporated by reference herein.

BACKGROUND OF THE INVENTION

1. Field of the Invention

The present disclosure relates to technologies of a biotechnology toilet provided with a decomposing process device of organic wastes, and the like.

2. Description of the Related Art

As for the global situation about toilet, Bill & Melinda Gates Foundation has announced to additionally contributes 42,000,000 dollars to Universities and scientists around the world as a developing fund for a new toilet (toilet better than flush toilet) which is sanitary and which employs a scheme of improving "supplement and storage of excrement", and of "utilizing those as energy and fertilizer" regarding the toilet improving project around the world. According to this announcement, it is pointed out that flush toilets "are not capable of processing wastes by the toilet itself", and even if the flush toilets are become common, nothing is improved when the wastes are "directly discharged to a water conduit".

In addition, the World Health Organization (WHO) has pointed out that nothing saved a large number of human lives and improved the health of people except the flush toilet, but also insists that "laxative diseases" are spreading because of "domestic drainage" and "direct discharge of excrement", causing equal to or greater than 1,500,000 to die in a year. The WHO is insisting governments in all countries that this is not a simple problem such that this can be addressed by installing a tool that is a toilet, and establishment of an infrastructure for properly processing excrement is necessary.

Under such a circumstance, the applicant of the present application has proposed various biotechnology toilets provided with decomposing process device that utilizes sawdust (see, patent document 1). In addition, as for the relevant technology, the applicant has proposed a biotechnology toilet provided with a decomposing process device which has two screws arranged in parallel with each other (Design Patent Publication, Registered Design Patent No. 1325100).

The basic principle of the biotechnology toilet provided with the decomposing process device that utilizes sawdust will be briefly described below. The "human wastes" which are organic wastes has equal to or greater than substantially 90% of the total dissipated by only evaporation of moisture content, and substantially 90% of the remaining 10% of the organic wastes are decomposed by microorganisms, and dissipated within the sawdust. The slight residue is a fertilizer component contained in foods (e.g., nitrogen, phosphorous, potassium, etc.), sticks to the pores that occupy substantially 50% of the entire sawdust, and eventually becomes a reusable organic fertilizer.

The above biotechnology toilet provided with the decomposing process device has the following features.

(1) not utilizing water, (2) utilizing ordinary sawdust, (3) not using a particular "bacillus", (4) there are multiple types with different process capacities (the mount of filled sawdust is 0.05 to 24 $m^3$), (5) the replacement cycle of sawdust is merely twice or three times per a year, (6) the sawdust after use can be utilized as organic fertilizer, and (7) useful as a toilet at the time of disaster.

In addition, the applicant of the present application carried out, as a commissioned business from foreign ministry (commissioned business founds are substantially JP 50,000,000 YEN), investigation research for water environment improvement matter from October 2013 to March 2014.

Still further, the applicant of the present application has installed, as a verification test of the biotechnology toilet provided with the decomposing process device in Vietnam, a total of 20 toilets which were three in a sight-seeing ship, three at a boatslip, three in an elementary school, and 11 in a community including general household as a popularization verification business by JICA (commissioned business funds: substantially JP 100,000,000 YEN). Along with this verification test, the applicant has a schedule from December 2015 to May 2018 for activities, such as an education for the feature of the biotechnology toilet provided with the decomposing process device, how to use such a toilet, and maintenance to prompt the understanding of the user, and business and employment creation within Vietnam, such as production, sales, improvement, and maintenance for the biotechnology toilet.

In view of such an oversea development, it becomes necessary that the biotechnology toilet provided with the decomposing process device needs to match the characteristics (including maintenance and operation) of foreign areas where drainage facilities are insufficient.

[Patent Document 1] Japan Patent No. 3909336

According to the above related technology, however, the number of the drive motors connected to drive and rotate the two screws for stirring the human wastes and sawdust of the biotechnology toilet provided with the decomposing process device is one, and the distribution of load applied to the drive motor is not taken into consideration.

In addition, any particular effort when at least either one of the two screws for stirring the human wastes and sawdust are overloaded due to, for example, mixing of foreign materials to the human wastes and sawdust is not provided.

An objective of the present disclosure is to provide a biotechnology toilet provided with a decomposing process device, etc., which can further reduce the risk of defect, improve the operating rate, and reduce the maintenance and service costs.

BRIEF SUMMARY OF THE INVENTION

A biotechnology toilet provided with a decomposing process device according to the present disclosure includes:

the decomposing process device including:

a process tank having a toilet bowl opening and an inspection opening formed in an upper surface;

two rotation shafts horizontally in the process tank so as to be in parallel with each other, and driven and rotatable in the process tank; and a conveying blade formed spirally around each of the rotation shaft; and a non-flush toilet bowl attached to a toilet bowl attachment plate that covers the toilet bowl opening of the decomposing process device, in which:

the conveying blades are disposed at both ends of the rotation shaft with reference to a substantially center portion thereof so as to have inverted spiral directions at the both ends, and divided into multiple pieces with a clearance in a lengthwise direction of the rotation shaft;

a circumferential stirring member that stirs an organic waste and a sawdust in a circumferential direction so as to prevent the organic waste and the sawdust from sticking to an internal side face of the process tank in an axial direction is fastened to each of the rotation shaft between the conveying blade and the internal side face of the process tank;

two drive mechanisms are provided on an outer side face of the process tank, the two rotation shafts are driven and rotated by the respective drive mechanisms connected one by one to the respective rotation shafts;

the two drive mechanisms are controlled by a single control device of the decomposing process device via different control circuits;

when an overload is applied to at least either one of the two rotation shafts when driven and rotated, the control device controls the two drive mechanisms so as to rotate the two rotation shafts counterclockwise for a predetermined time, and then controls the two drive mechanisms so as to rotate the two rotation shafts clockwise, and when the overload is not addressed by repeating, three times, the sequential control of the counterclockwise rotation and the clockwise rotation, the control device deactivates the two drive mechanisms, and notifies a user of an occurrence of the overload via predetermined notification means; and the sawdust put in the process tank via the toilet bowl opening or the inspection opening of the decomposing process device can be taken out from two sawdust extraction openings provided in a side face of the process tank.

By employing the above structure, the two drive mechanisms are provided on the outer side face of the process tank, and the two rotation shafts are respectively driven and rotated by the drive mechanisms connected one by one to the respective rotation shafts. Hence, in comparison with a structure in which the two rotation shafts are driven and rotated by a single drive mechanism, a load to the drive mechanisms can be distributed.

In addition, when an overload is applied to at least either one of the two rotation shafts when driven and rotated, the control device controls the two drive mechanisms so as to rotate the two rotation shafts counterclockwise for a predetermined time, and then controls the two drive mechanisms so as to rotate the two rotation shafts clockwise, and when the overload is not addressed by repeating, three times, the sequential control of the counterclockwise rotation and the clockwise rotation, the control device deactivates the two drive mechanisms, and notifies a user of an occurrence of the overload via predetermined notification means. Hence, a defect risk of the rotation shaft and that of the drive mechanism can be reduced, improving the operation availability of the biotechnology toilet provided with the decomposing process device, and reducing the maintenance and service costs.

In addition, a ready-to-assemble lavatory according to the present disclosure includes the above biotechnology toilet provided with the decomposing process device.

According to the present disclosure, a biotechnology toilet provided with a decomposing process device, etc., which can further reduce the risk of defect, improve the operating rate, and reduce the maintenance and service costs are provided.

BRIEF DESCRIPTION OF THE DRAWINGS

FIGS. 2A and 2B are each a plan view and a perspective view illustrating a condition in which the non-flush toilet bowl and a toilet bowl attachment plate in FIG. 1 are detached;

FIGS. 9A to 9D are each a front view (9A), a back view (9B), and right and left side views (9C and 9D) illustrating a structure of a ready-to-assemble lavatory having the biotechnology toilet provided with the decomposing process device according to a second embodiment of the present disclosure.

DETAILED DESCRIPTION OF THE INVENTION

Figure 1:
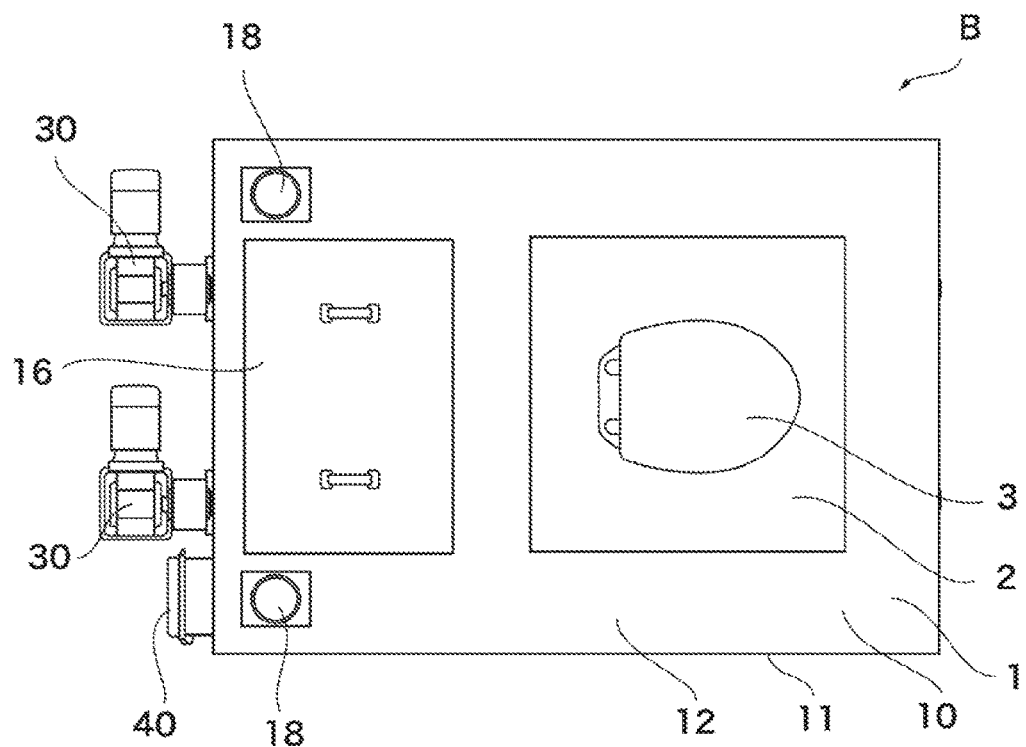
FIG. 1 is a plan view illustrating the structure of a biotechnology toilet provided with a decomposing process device according to a first embodiment of the present disclosure.
Figure 3:
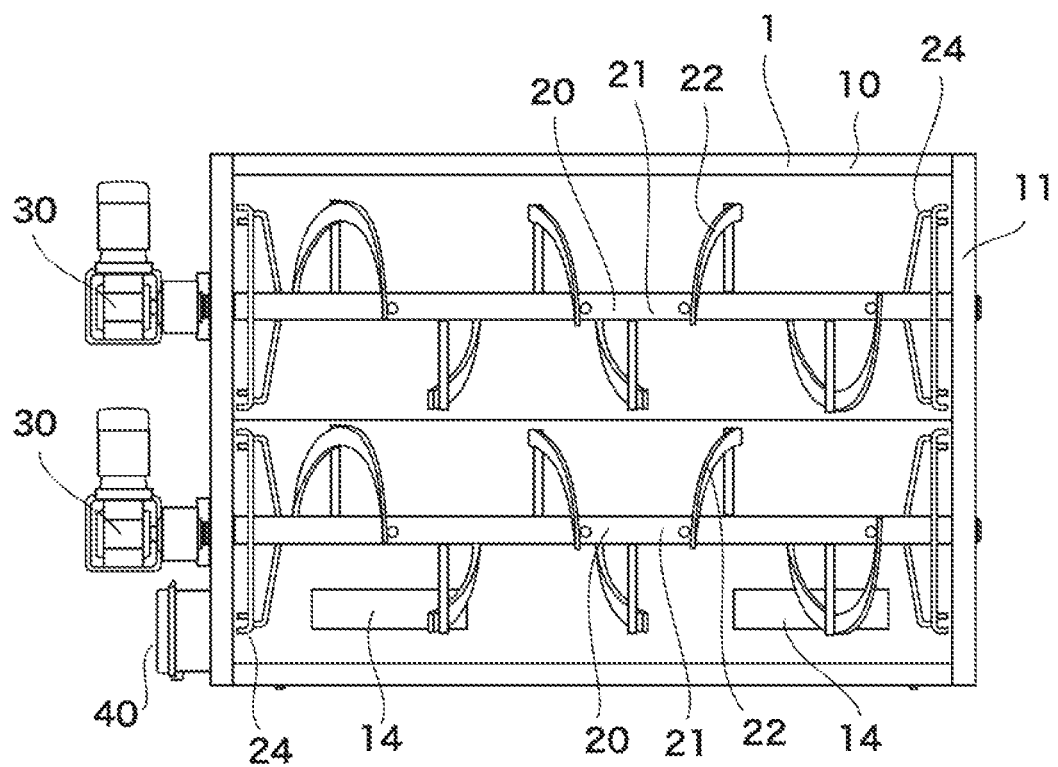
FIG. 3 is a plan view illustrating a condition in which an upper plate in FIG. 1 is detached.
Figure 4:
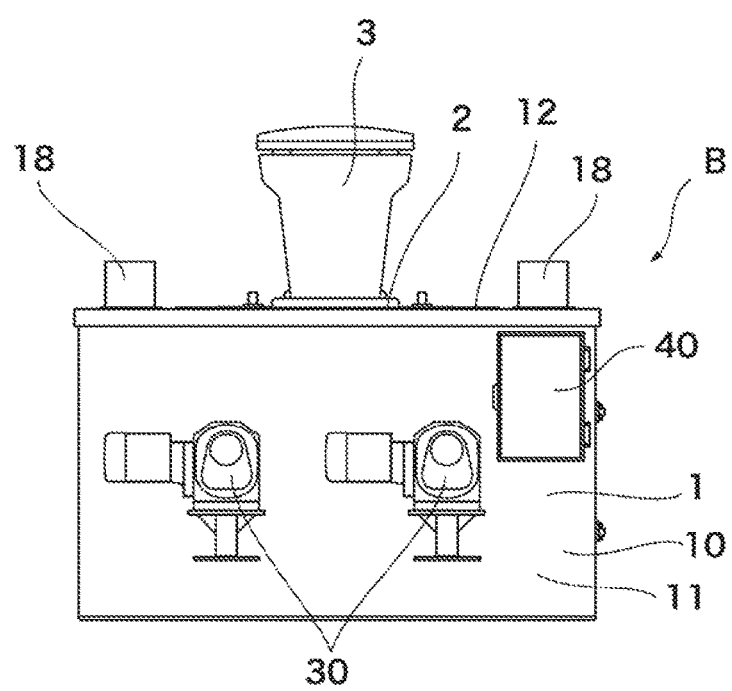
FIG. 4 is a left side view illustrating a structure of the biotechnology toilet provided with the decomposing process device according to the first embodiment of the present disclosure.
Figure 5:
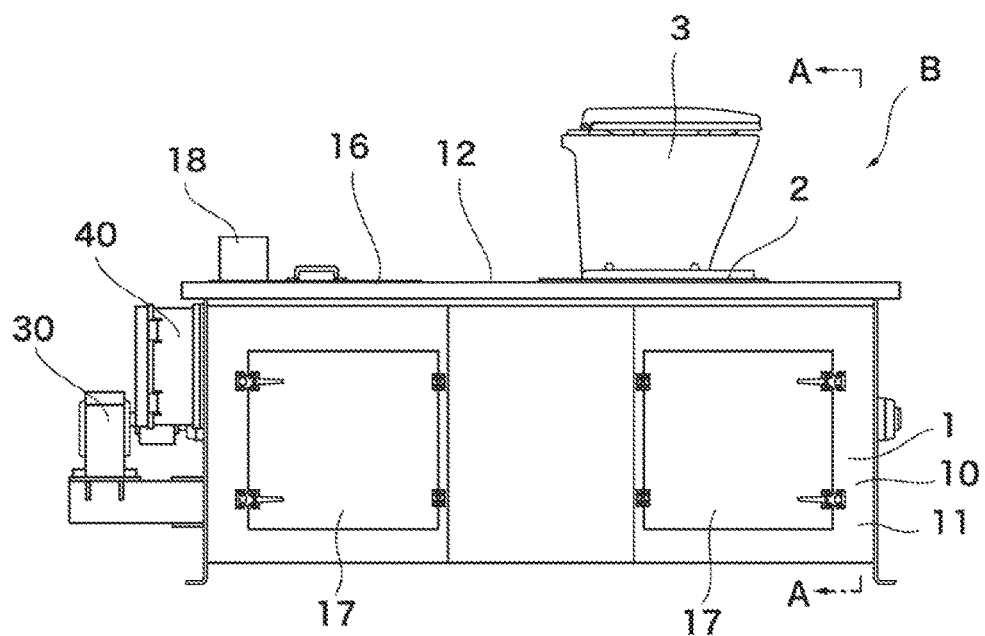
FIG. 5 is a front view illustrating a structure of the biotechnology toilet provided with the decomposing process device according to the first embodiment of the present disclosure.

A structure of a biotechnology toilet B provided with a decomposing process device according to a first embodiment of the present disclosure will be described with reference to the figures.

[Biotechnology Toilet Provided with Decomposing Process Device]

As illustrated in FIG. 1 to FIG. 6, the biotechnology toilet B provided with the decomposing process device in this embodiment includes a decomposing process device 1, a toilet bowl attachment plate 2, and a non-flush toilet bowl 3 attached thereto.

[Decomposing Process Device]

As illustrated in FIG. 1 to FIG. 6, the decomposing process device 1 in this embodiment processes organic wastes that are human wastes r and toilet paper, etc., (hereinafter, collectively referred to as "human wastes r") so as to eventually become reusable organic fertilizer using sawdust p that is a microbial decomposition process medium. This decomposing process device has a toilet bowl opening 15 and an inspection opening 16 in the upper surface of a process tank 10, and also has two screws 20 that are stirring members stirring the human wastes r together with the sawdust p.

[Process Tank]

Figure 6:
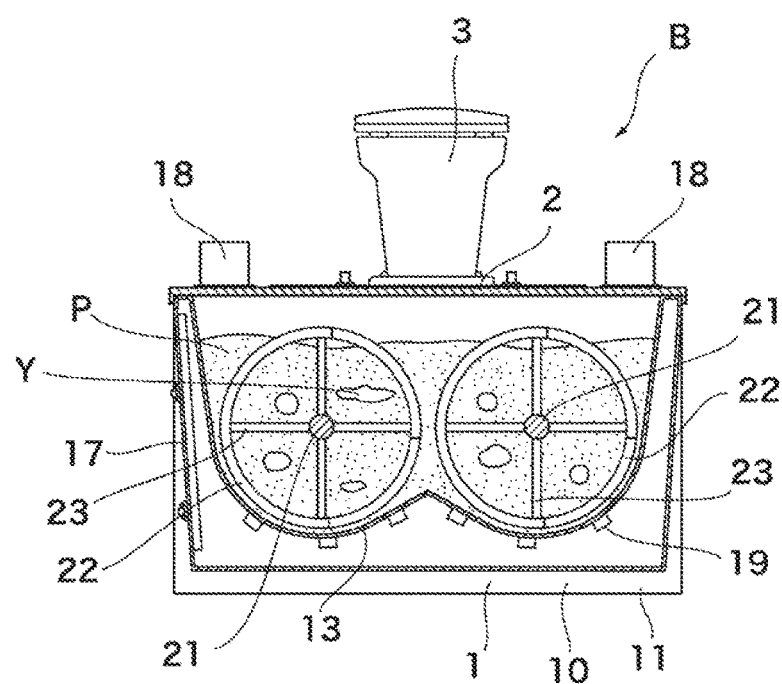
FIG. 6 is a cross-sectional view taken along a line A-A in FIG. 5.

With reference to FIGS. 1 to 6, the process tank 10 will be described in full detail. The process tank 10 is formed of a corrosive-resistant metal plate like stainless steel, and as illustrated in FIG. 6, a bottom plate 13 formed in a shape obtained by interconnecting two curved plates corresponding to the respective circumferential shapes of the two screws 20 is fastened in a casing 11 in a box shape having an opened upper end, and thus two right and left tank bottom portions are formed. As illustrated in FIG. 6, as viewed in a side cross-section, since the bottom plate 13 is formed in a substantially W-shape, a boundary between the two right and left tank bottom portions is convex. Accordingly, a structure is employed that can avoid an occasion such that, with respect to the human wastes r and the sawdust p to be pushed against and stuck to the bottom plate 13 of the process tank 10 due to the conveyance of conveying blades 22, the distance from the conveying blades 22 increases, and thus stirring force decreases.

In addition, two bottom plate sawdust extraction openings 14 (see FIG. 3) provided in either right or left side of the bottom plate 13 of the process tank 10 are each provided with an openable and closable lid relative to the opening, enabling a periodical collection of the sawdust p (containing the human wastes r).

Still further, the upper opening of the casing 11 is closed by an upper plate 12, and this upper plate 12 is provided with the toilet bowl opening 15 and the inspection opening 16 which is utilized for loading the sawdust p or for inspecting the interior, and which is provided with an openable and closable lid.

The upper plate 12 is provided with the toilet bowl attachment plate 2 to which a non-flush toilet bowl 3 is attached so as to cover the toilet bowl opening 15.

In addition, two casing sawdust extraction openings 17 provided in either right or left side of the casing 11 of the process tank 10 are each provided with an openable and closable lid relative to the opening, enabling a periodical collection of the sawdust p (containing the human wastes r) when the respective lids of the corresponding two bottom plate sawdust extraction opening 14 are also opened and closed.

Still further, although it is necessary that the sawdust p is loaded in the process tank 10 beforehand, the loading of the sawdust p from the upper space may be carried out via the toilet bowl opening 15 from the non-flush toilet bowl 3 or may be carried out with the lid of the inspection opening 16 being opened.

Yet still further, air in the process tank 10 may be discharged from the ventilation pipes (unillustrated) respectively connected to two ventilation openings 18 provided in the upper plate 12 of the process tank 10, and thus the moisture content in the process tank 10 may be efficiently evaporated and discharged.

The ventilation pipe may be provided with a ventilation intermediate fan, a deodorization filter within the ventilation pipe, and a ridge piece that prevents rain from entering from the exterior, as needed. In addition, either one ventilation pipe may supply air in the process tank 10 so as to balance the discharging flow volume as needed.

In addition, a heater 19 (see FIG. 6) that is a heating member in contact with the lower surface of the bottom plate 14 of the process tank 10 is provided. The heater 19 maintains the human wastes r and the sawdust p at a suitable temperature for microbial decomposition, and evaporates the moisture contained in the human wastes r, thereby suppressing a reduction of the microbial decomposition process ability due to excessive moisture.

For example, the heater 19 is a conventionally known heater that has a power of 800 W, and one or multiple heaters 19 are fastened to the lower surface of the bottom plate 14 of the process tank 10. The heater 19 is subjected to a voltage control so as to evaporate the moisture in the process tank 10, and set the temperature in the process tank 10 to be a suitable temperature (60 to 80 degrees) for microbial decomposition. When there is excessive moisture in the human wastes r in the process tank 10, in order to evaporate such a moisture, the applied voltage to the heater may be increased, and when the moisture decreases due to the evaporation, the applied voltage to the heater 19 may be reduced so as to set the interior of the process tank 10 to be a suitable temperature (60 to 80 degrees) for microbial decomposition.

[Screw (Stirring Member)]

The two screws 20 will be described in full detail with reference to FIG. 1 to FIG. 7, and two rotation shafts 21 that are rotatable are provided in parallel with each other and horizontally at a location substantially center of the height in the casing 11 of the process tank 10. The rotation shaft 21 has both ends passing completely through the side faces of the casing 11, are supported by bearings fastened to the side faces of the casing 11 of the process tank 10, and the one end is connected to each of two drive motors 30 one by one. In addition, conveying blades 22 and circumferential stirring members 24 are supported around the rotation shaft 21.

The structure of the screw 20 is not limited to the above structure as long as the screw has a function of stirring and mixing the human wastes r and the sawdust p so as to prompt the microbial decomposition in the process tank 10.

[Conveying Blade]

Figure 7:
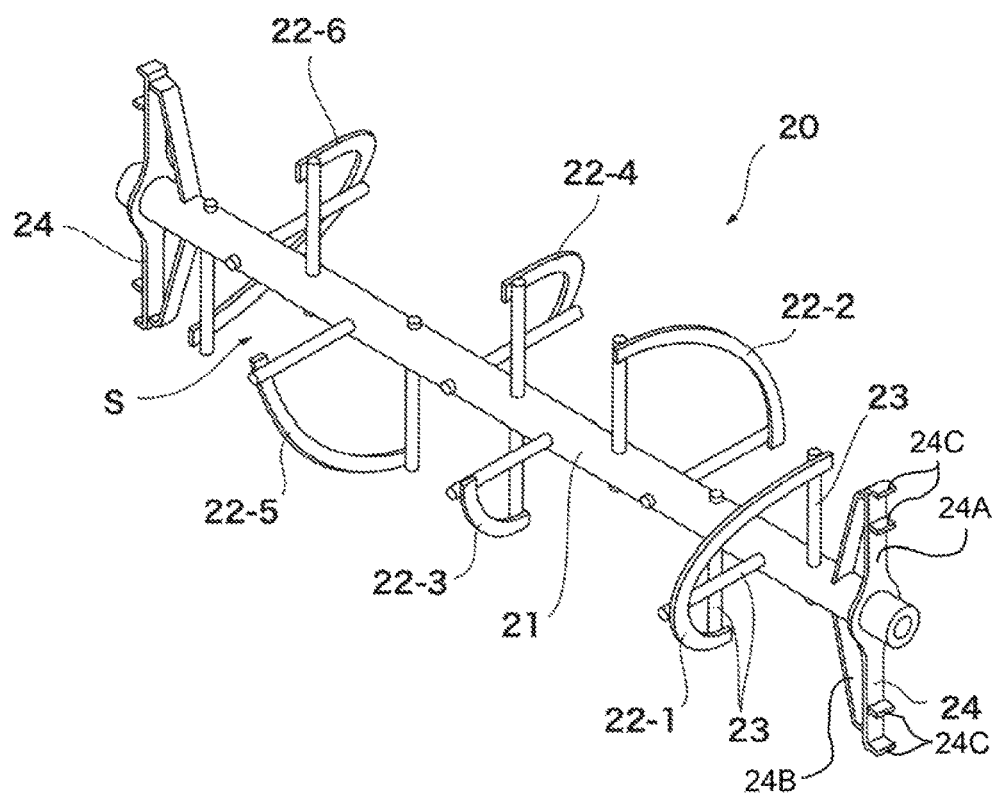
FIG. 7 is a perspective view illustrating an example screw for the biotechnology toilet provided with the decomposing process device according to the first embodiment of the present disclosure.

The conveying blades 22 of the screw 20 will be described in detail with reference to FIG. 7, and the conveying blade 22 is spiral pieces formed in a shape along the rotation shaft 21 in the circumferential direction, divided into multiple pieces in the lengthwise direction via a clearance s, and the pieces formed in substantially ⅔ shape when divided in three pieces in the circumferential directions are end members 22-1 and 22-6, and pieces formed in a substantially ⅓ shape when divided in three pieces in the circumferential directions are four members 22-2, 22-3, 22-4, and 22-5 provided inwardly relative to the end members. Each member 22-1 to 22-6 of the conveying blade 22 is welded to leading ends of three or two support members 23 provided radially in the centrifugal direction from the rotation shaft 21.

In addition, the spiral pieces as the conveying blades 22 are respectively disposed toward respective ends of the rotation shaft 21 in the axial direction with reference to the substantial center in the axial direction, and are disposed in such a way that the spiral directions of the spiral pieces in the intermittent spiral shape are reversed at both ends of the rotation shaft. That is, the set of the members 22-1, 22-2, and 22-3, and the set of the members 22-4, 22-5, and 22-6 have reversed spiral directions.

The dimension of the clearance s is set as appropriate in accordance with the material of the conveying blade 22 and the dimension thereof, etc., so as to release stress produced when the human wastes r and the sawdust p are conveyed in the axial direction, and preferably, set to be substantially equal to the widthwise dimension of the conveying blade 22.

That is, when this clearance s is too large, the ability of the conveying blade 22 to convey the human wastes r and the sawdust p in the axial direction is decreased, and when the clearance s is too small, it becomes difficult to release stress applied to the conveying blades 22.

In addition, as illustrated in FIG. 6, the respective conveying blades 22 of the two rotation shafts 21 provided in parallel with each other are disposed so as not to interfere with each other when the rotation shafts 21 are driven and rotated.

[Circumferential Stirring Member]

The circumferential stirring member will be described with reference to FIG. 7. The circumferential stirring member 24 includes a main stirring bar 24A substantially orthogonal to the rotation shaft 21, a reinforcement stirring bar 24B that supports the main stirring bar 24A from the center direction of the rotation shaft 21 in a brace structure, and multiple scraping pieces 24C that protrude from the main stirring bar 24A toward the end of the rotation shaft 21 (toward the internal side surface of the process tank 10), and the circumferential stirring members 24 are fasted at respective circumferences of both ends of the rotation shaft 21.

The main stirring bar 24A is formed of an elongated metal plate with a substantially rectangular cross-section, and the rotation shaft 21 passes completely through the expanded center portion of the main stirring bar and welded thereto. The main stirring bar 24A stirs the human wastes r and the sawdust p within the process tank 10 in the circumferential direction.

The reinforcement stirring bar 24B supports the main stirring bar 24A from the center direction of the rotation shaft 21 so as to prevent the main stirring bar 24A from being deformed or damaged due to reaction force applied from the side surface side of the process tank 10 via the human wastes r and the sawdust p. The reinforcement stirring bar 24B stirs the human wastes r and the sawdust p in the circumferential direction of the rotation shaft 21 together with the main stirring bar.

The scraping piece 24C is a metal plate formed in a rectangular shape in a planar view, and the multiple scraping pieces are welded to the main stirring bar so as to cause the protruding ends to be close to the internal side surface of the process tank 10. The scraping pieces 24C stir and scrape, in the circumferential direction of the rotation shaft 21, the human wastes r and the sawdust p that are pushed against the internal side surface of the process tank 10 and stick thereto and solidified by conveyance force of the conveying blades 22.

[Drive Motor (Drive Mechanism)]

As illustrated in FIGS. 1 to 5, the respective rotation shafts 21 of the two screws 20 are coupled with the drive shafts of the respective drive motors 30. The drive motor 30 is a gearmotor that has built-in gears so as to reduce the rotation speed of the drive shaft and to reduce a load torque, and the two drive motors 30 are controlled by different control circuits (unillustrated) via a control board 60 that is a control device, and thus the two screws 20 are driven and rotated (clockwise or counterclockwise) continuously or intermittently as appropriate.

The structure of the drive mechanism is not limited to the above structure, and the drive mechanism may be a mechanism that utilizes a motor, a chain, and a sprocket, or a wheel may be attached to the end of the rotation shaft 21 exposed to the exterior of the casing 11 of the process tank 10, and the screw 20 may be turned manually by turning the wheel.

According to conventional biotechnology toilet provided with a decomposing process device, there is only a single drive motor corresponding to the two screws to stir the human wastes r together with the sawdust p, and an overload may be applied since the load applied to the drive motor is not distributed. By providing the two drive motors 30 corresponding to the two screws 20 one by one, the load applied to the respective motors can be distributed, decreasing a defect risk of the drive motor 30.

In particular, according to the biotechnology toilet provided with the decomposing process device, in order to efficiently dry the human wastes r and the sawdust p, when the volume of the process tank 10 is consistent, a structure that has a larger area and shallower depth is preferable in comparison with a structure that has a small area and a deeper depth. In addition, when the area is increased, in order to fully stir the human wastes r and the sawdust p, the multiple screws 20 are necessary.

When the two drive motors 30 are provided, depending on the size of the process tank 10, each drive motor 30 may be a compact motor, and a large-size drive motor is unnecessary, and thus a general-purpose drive motor is applicable, decreasing the costs.

[Control Board (Control Device)]

As illustrated in FIGS. 1 to 4, a control board 40 that is a single control device provided for the decomposing process device 1 controls the two drive motors 30 via different control circuits (unillustrated). Since there is the single control board 40, a space saving effect is achieved. The control device may be accomplished by other conventionally known information processing devices.

In addition, the control board 40 controls the drive motor 30 in such a way that the screw 20 periodically repeats stirring and stop, and controls the heater 19 so as to be operated at least during the stirring operation of the screw 20 and deactivates the heater 19 entirely or partially during the stopping time of the screw 20.

The drive motor 30 is controlled in such a way that the screw 20 repeats clockwise rotation and counterclockwise rotation with the stopping time of the screw 20 therebetween. Hence, the main conveyance direction of the human wastes r and the sawdust p is inverted since the rotation of the screw 20 is inverted per a certain time, and the human wastes r and the sawdust p are moving across the two right and left tank bottom portions.

An example of the above control circuit will be described in detail. The control device is provided with a contact means (unillustrated) that turns ON every time the decomposing processing device 1 is utilized, and includes a timer means in the control board 40.

The timer means is a control circuit that includes a relay circuit, a sequencer, etc., starts, every time the contact means is turned ON, counting a set time, maintains the current carrying to the heater 19 in the decomposing processing device 1 during the counting, and stops the current carrying to the heater 19 after the set time has elapsed when the contact means is not turned ON within the set time.

More specifically, when the contact means is turned ON, the screws 20 in the decomposing process device 1 are rotated for a predetermined time period by the respective drive motors 30, and simultaneously, the timer means starts counting and current carrying to the heater 19.

When the contact means is turned ON during the counting, the timer starts again the counting from zero, and maintains the current carrying to the heater 19.

In addition, during the counting, when the contact step is not turned ON at all during the counting, after the set time elapses, the timer means terminates the current carrying to the heater 19.

Still further, when the contact means is turned ON after the set time elapses, the timer means starts again counting from zero, and starts again current carrying to the heater 19, and the above operation will be repeated.

Since the heater 19 is controlled by the above timer means, a reduction of the microbial decomposing process efficiency due to excessing drying within the process tank 10 can be prevented, and an occasion of fire can be suppressed.

In addition, the control board 40 may control the drive motors 30 and cause the screws 20 to start stirring in accordance with a predetermined depress operation by the use to the switch after the use of the biotechnology toilet B with the decomposing process device.

Still further, when the control board 40 detects an overload due to, for example, foreign materials mixed with the human wastes r and the sawdust p to at least either one of the two screws 20 when those are driven and rotated, the control board 40 controls both the two drive motors 30 so as to turn the two screws 20 counterclockwise for a predetermined time period. This is because, when an overload is applied to the screws 20 due to mixing of the foreign materials, etc., and the rotation of the screw 20 stops, the drive motor 30 may repeat an operation of once stopping the operation, and starting again the operation. This causes an overload to the drive motor 30, causing the screw 20 and the drive motor 30 to be defective. Hence, by once rotating the screw counterclockwise to move back the human wastes r and the sawdust p, it is attempted whether or not the obstacle due to the foreign materials can be eliminated.

Next, after the predetermined time period has elapsed, both the control boards 40 control the respective two drive motors 30 so as to rotate both the two screws 20 clockwise (return the counterclockwise rotation to the original rotation). At this time, when the overload to the screw 20 is addressed, there is no problem. In contrast, when the overload to at least either the two screws 20 is not addressed and still remains, the control board 40 again drives the two drive motors 30 so as to rotate the two screws 20 clockwise. Next, after the predetermined time has elapsed, the control board 40 again controls both the two drive motors 30 so as to rotate the two screws 20 clockwise.

As described above, by repeating a sequential control of counterclockwise rotation and clockwise rotation by multiple times (preferably, three times in view of effect and efficiency), when the overload is addressed during this control, there would be no problem, and when the overload to at least one of the two screws still remains, the control board 40 controls the two drive motors 30 so as to be deactivated. Next, the control board 40 notifies the user of the overload to at least either the two screws 20 by a predetermined notification means, such as a blinking alert lamp or an alert sound output by a speaker. Since the two drive motors 30 are controlled by the different control circuits, respectively, the signal may be analyzed to specify which one of the screw 20 the overload is being applied, and the result may be notified to the user. By carrying out an inspection work in response to this notification, the screw 20 can be prevented from being damaged, and an occurrence of a defect like locking of the drive moto 30 can be avoided beforehand. Hence, a defect risk can be reduced, increasing the operation availability of the biotechnology toilet B provided with the decomposing process device, and reducing maintenance and service costs.

[Non-Flush Toilet Bowl]

Provided on the upper plate 12 of the process tank 10 of the decomposing process device 1 is the toilet bowl attachment plate 2 which is in a substantially square shape, and to which the non-flush toilet bowl 3 is attached so as to cover the toilet bowl opening 15.

Figure 8:
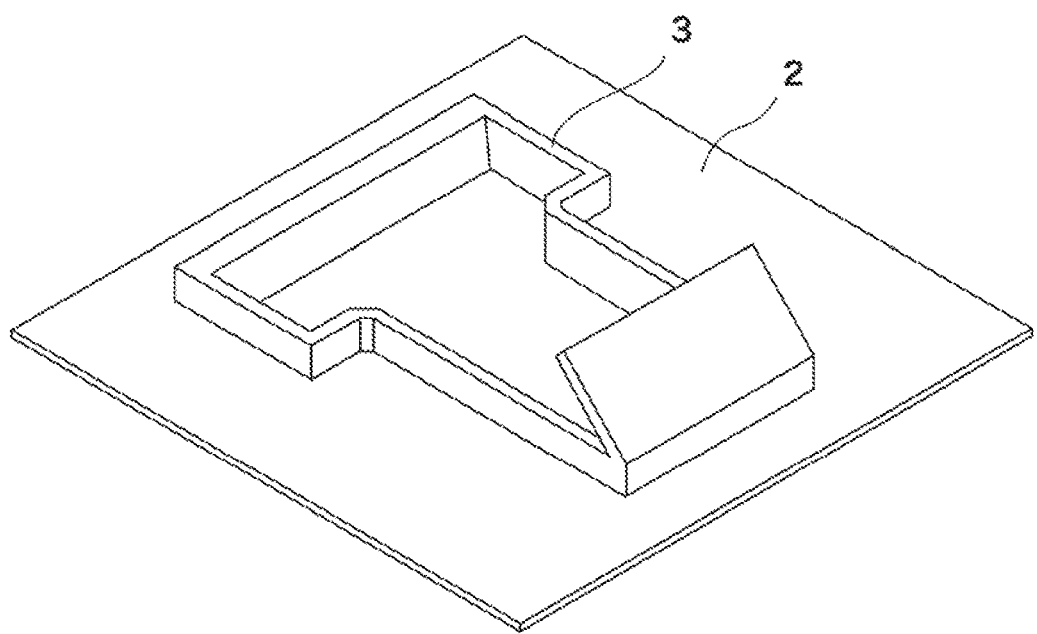
FIG. 8 is a diagram illustrating another example of the non-flush toilet bowl of the biotechnology toilet provided with the decomposing process device according to the first embodiment of the present disclosure.

As for the non-flush toilet bowl 3, as illustrated in FIG. 1, and FIGS. 4 to 6, a set of an Western-style toilet bowl provided with a heating toilet seat, or a Japanese-style toilet bowl (formed of stainless steel) having a T-shape opening in a planar view as illustrated in FIG. 8, and the like are applicable. In the case of the Japanese-style T toilet bowl, since the peripheral edge of the opening of the toilet bowl is concavity, it is easy to set the foot positions of the user to an optimized location, and the opening in a substantially T-shape in a planar view is a shape opened widely at the rear portion, a false stick of human wastes to the toilet bowl can be minimized.

In addition, as for the Japanese-style T toilet bowl as illustrated in FIG. 8, in the oversea regions where sewerage facilities are not fully provided, many users relieve nature across a box-shape container, and the similar Japanese-style toilet bowl is likely to be accepted for such users, and a disadvantage such that users do not know how to use a western-style toilet bowl is avoidable, thus quite matching to the oversea toilet bowl markets.

Figure 10A:
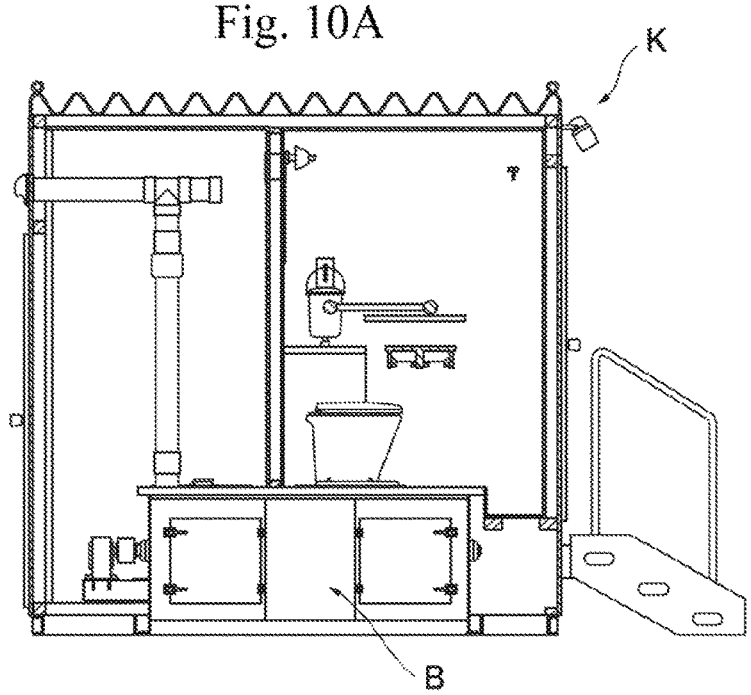
FIGS. 10A and 10B are each a cross-sectional view taken along a line A-A in FIG. 9A and taken along a line B-B in FIG. 9A.
Figure 10B:
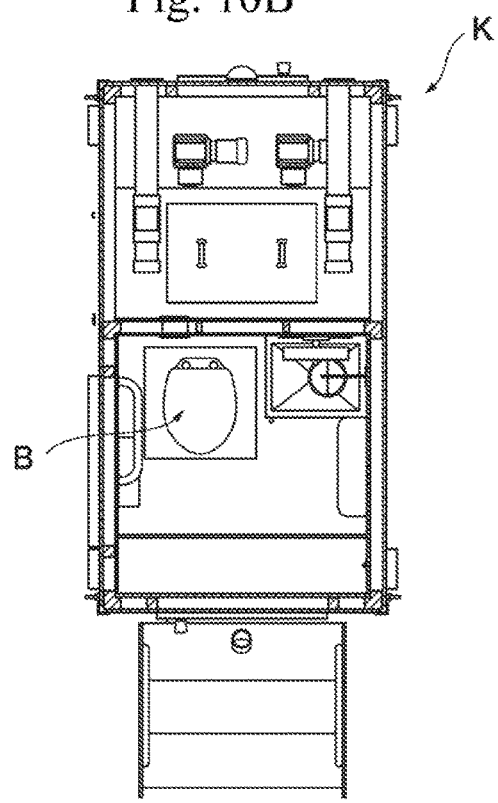

Next, a structure of a ready-to-assemble lavatory K including the biotechnology toilet provided with the decomposing process device according to a second embodiment of the present disclosure will be described with reference to FIG. 9 and FIG. 10.

This lavatory is a lavatory in which the biotechnology toilet B provided with the decomposing process device is built, two toilet-bowl sawdust extraction opening 50 corresponding to the two casing sawdust extraction openings 17 of the biotechnology toilet B provided with the decomposing process device are provided at the side wall of this lavatory, and each formed by an openable and closable door. Hence, the sawdust p (including the human wastes r) can be collected at a constant cycle.

In addition, an inspection door 60 is provided in the rear wall of the lavatory, and thus the convenience to inspect the interior of the device from the inspection opening 16 of the decomposing process device 1 of the biotechnology toilet B.

Still further, this lavatory may be further provided with up and down stairs, air feeding/discharging hood, etc., and internal facilities, such as an indoor lamp, a coat hook, a wood rack, a wash-basin, and an arm rail.

Yet still further, although it is not illustrated, various changes can be made to the present disclosure without departing from the scope of the present disclosure. For example, the shape, size, number, location, material, etc., of each component can be changed as appropriate as long as the effect of the present disclosure is achievable.

What is claimed is:

1. A biotechnology toilet provided with a decomposing process device, the biotechnology toilet comprising:
   the decomposing process device comprising:
   a process tank having a toilet bowl opening and an inspection opening formed in an upper surface;
   two rotation shafts horizontally in the process tank so as to be in parallel with each other, and driven and rotatable in the process tank; and
   a conveying blade formed spirally around each of the rotation shaft; and
   a non-flush toilet bowl attached to a toilet bowl attachment plate that covers the toilet bowl opening of the decomposing process device, wherein:
   the conveying blades are spiral pieces formed on both sides of the rotation shaft with reference to a substantially center portion of the rotation shaft;

the spiral pieces are divided into multiple pieces respectively at the both sides of the substantially center portion with a clearance in a lengthwise direction of the rotation shaft;

spiral directions of the spiral pieces are reversed to each other between the both sides of the substantially center portion;

a circumferential stirring member that stirs an organic waste and a sawdust in a circumferential direction so as to prevent the organic waste and the sawdust from sticking to an internal side face of the process tank in an axial direction is fastened to each of the rotation shaft between the conveying blade and the internal side face of the process tank;

the circumferential stirring member includes a main stirring bar substantially orthogonal to the rotation shaft, a reinforcement stirring bar that supports the main stirring bar from the center direction of the rotation shaft in a brace structure, and multiple scraping pieces that protrude from the main stirring bar toward the internal side face of the process tank;

two drive mechanisms are provided on an outer side face of the process tank, the two rotation shafts are driven and rotated by the respective drive mechanisms connected one by one to the respective rotation shafts;

the two drive mechanisms are controlled by a single control device of the decomposing process device via different control circuits;

the control device controls the two drive mechanisms to repeat rotating the two rotation shafts in a same direction and rotating the two rotation shafts in an inverted direction to the foregoing direction across a predetermined stop interval;

when an overload is applied to at least either one of the two rotation shafts when driven and rotated, the control device controls the two drive mechanisms so as to rotate the two rotation shafts in the inverted direction to the rotation direction before the overload occurs for a predetermined time, and then controls the two drive mechanisms so as to rotate the two rotation shafts in the direction before the overload occurs, and when the overload is not addressed by repeating, three times, the sequential control of the rotation in the inverted direction to the rotation direction before the overload occurs and the rotation in the rotation direction before the overload occurs, the control device deactivates the two drive mechanisms, and notifies a user of an occurrence of the overload via predetermined notification means; and the sawdust put in the process tank via the toilet bowl opening or the inspection opening of the decomposing process device can be taken out from two sawdust extraction openings provided in a side face of the process tank.

2. A ready-to-assemble lavatory comprising the biotechnology toilet provided with the decomposing process device according to claim 1.

* * * * *